United States Patent [19]
Nelson

[11] 4,017,240
[45] Apr. 12, 1977

[54] DIE FOR EXTRUDING SHEET MATERIAL

[75] Inventor: Robert F. Nelson, Canton, Ohio

[73] Assignee: Rubbermaid Incorporated, Wooster, Ohio

[22] Filed: Nov. 19, 1975

[21] Appl. No.: 633,435

[52] U.S. Cl. ............... 425/192 R; 264/176 R; 425/376 R; 425/461

[51] Int. Cl.² ........................................ B29F 3/06

[58] Field of Search ............ 259/191, 192, 193, 4; 264/174, 176 R; 425/190, 191, 192, 376, 382, 461, 463, 464, 133.5

[56] References Cited
UNITED STATES PATENTS

| | | | |
|---|---|---|---|
| 2,734,224 | 2/1956 | Winstead | 425/461 X |
| 3,561,053 | 2/1971 | Pearson | 425/382 X |
| 3,825,645 | 7/1974 | Fayet | 425/461 X |
| 3,860,686 | 1/1975 | Myers | 425/113 X |

Primary Examiner—Francis S. Husar
Assistant Examiner—Mark Rosenbaum
Attorney, Agent, or Firm—E. R. Hamilton

[57] ABSTRACT

Sheet extrusion of elastomeric material wherein an extruded strand is passed through a die having a symmetrical runner system which divides and subdivides said strand into multiple strands equal in length and cross section, and then gradually transforms the multiple strands into laterally adjoining flattened triangular portions in which substantially the same cross-sectional area is maintained as the cross-sectional shape changes, with alternate triangular portions overlapping the other triangular portions in staggered relation and all of said triangular portions terminating in a continuous lateral exit slot.

8 Claims, 15 Drawing Figures

DIE FOR EXTRUDING SHEET MATERIAL

BACKGROUND OF THE INVENTION

While a symmetrical runner system has been used in injection molding to divide a cylindrical extruded strand of rubber or plastic material into multiple strands supplying multiple mold cavities, such a systemto my knowledge has never been used to extrude a sheet of either material. Certain plastic materials as distinguished from rubber have been extruded in sheet form by merging a substantially cylindrical runner into a flattened triangular passageway of gradually decreasing thickness, sometimes called a "coat-hanger" passageway, but there have been severe limitations on width and thickness of a sheet extruded by this method due to variations in resistance to flow as the passageway changes from cylindrical to triangular shape of gradually decreasing thickness. In other words, the thinner the sheet produced the greater limitation of its width because the wider the die the greater variation in resistance to material flow. Also, it has been desirable to provide means for adjusting the thickness of the passageway to compensate for changes in flow resulting from friction and viscosity.

Accordingly, to produce thinner and wider sheets of plastic material, a tubular extrusion is normally produced through a tubular die and the extrusion is blown or expanded internally to expand the diameter and reduce the thickness, after which the tube is split and opened into a flat sheet.

This expanded tubular extrusion method has been used to some extent to produce rubber sheeting, but since the widths and thicknesses of rubber sheeting produced by this method are so limited, calendering is usually resorted to in order to obtain uniformly thin sheets in wider widths. It has not been possible, to my knowledge, to satisfactorily produce a flat rubber sheet directly from an extrusion die primarily because of the greater changes in flow characteristics and viscosity of rubber as compared with plastics. In rubber compounds the constantly changing flow characteristics and viscosity have prevented obtaining uniform flow across the web of prior sheet extrusion dies with consequent non-uniformity in the product.

SUMMARY OF THE INVENTION

The present invention comprises passing an extruded strand of solid cross section through a die having a symmetrical multiple runner system which forms divided and subdivided strands equal length and cross section into narrow adjoining flattened triangular portions overlapping alternate adjoining triangular portions in staggered relation, and all triangular portions terminate and merge together at a continuous transverse exit slot.

It is a general object of the present invention to provide a novel and improved method for extruding elastomeric materials in thin sheet form and to provide a novel die for carrying out said method.

More specifically, it is an object to provide a novel method and die which produces extruded rubber or plastic sheeting in substantial widths.

Another object is to provide a one-step method for extruding relatively wide thin sheets of rubber or plastic material directly from the extruded strand produced by a conventional screw extruder, without requiring calendering or other reducing treatment.

A further object is to provide a novel and improved sheet extrusion die for extruding elastomeric material having a symmetrical runner system feeding alternate equal strands to a plurality of overlapping spaced-apart passageways of vertically decreasing and laterally expanding dimensions in staggered relationship and terminating in a continuous extrusion slot.

A still further object is to provide an improved die in which the overlapping staggered passageways are incorporated in a removable cross bar.

DESCRITPION OF A PREFERRED EMBODIMENT

Figure 4:
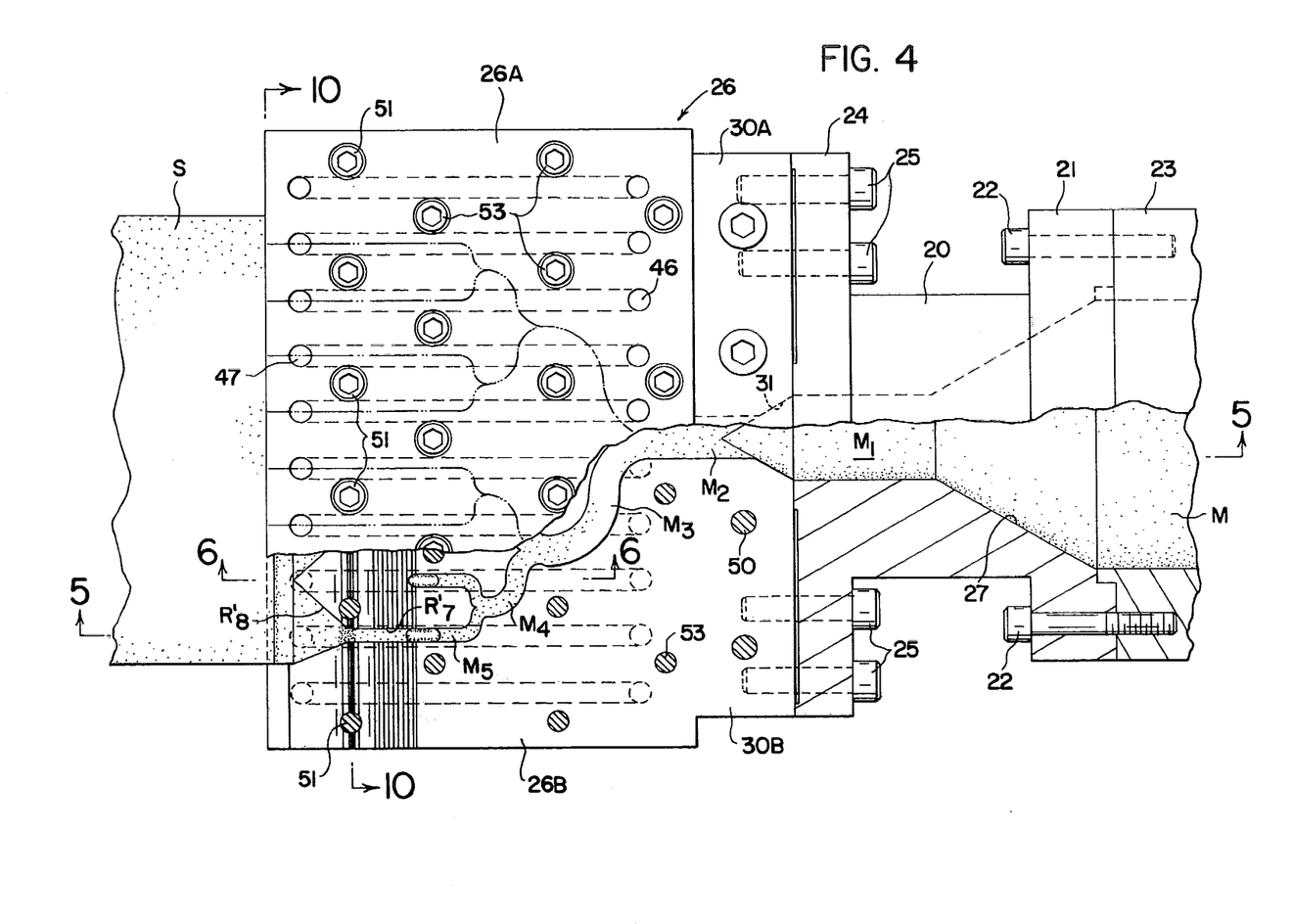
FIG. 4 is a top plan elevational view, partly broken away and in section, as on line 4—4 of FIG. 5.
Figure 5:
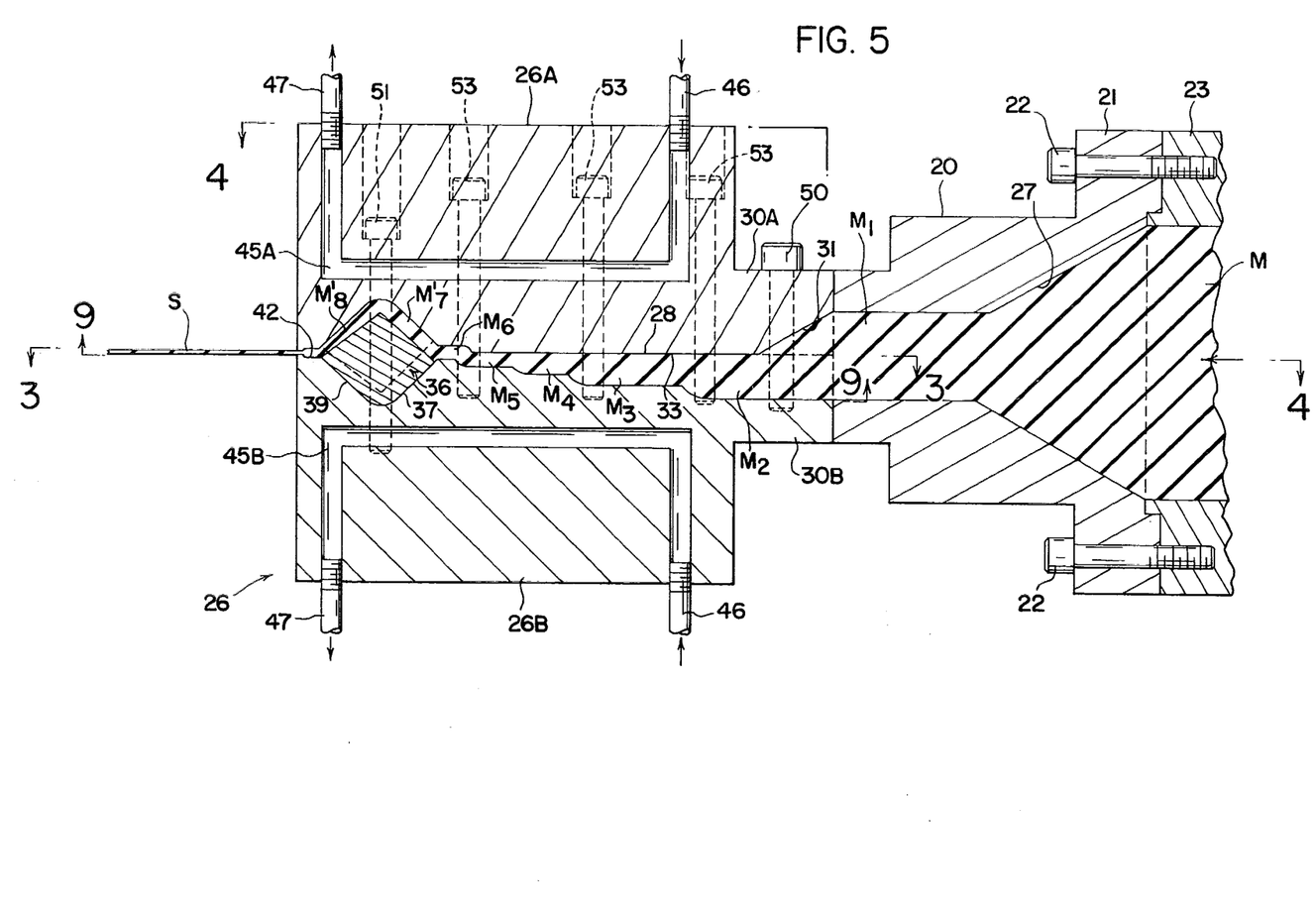
FIG. 5 is a sectional view on line 5—5 of FIG. 4.

As best shown in FIGS. 4 and 5, an adapter nozzle 20 has a rear flange 21 connected by screw studs 22 to the discharge orifice 23 of a conventional screw extruder (not shown), and a front flange 24 connected by screw studs 25 to the rear face of a sheet extrusion die indicated as a whole at 26 and comprising upper and lower parts 26A and 26B. The adapter nozzle 20 has a tapered bore 27 which substantially reduces the cross section of the strand of elastomeric material M coming from the extruder to a concentric cylindrical portion $M_1$, and the axis of the strands M and $M_1$ lies in the parting line or plane 28 between the upper and lower die parts 26A and 26B and in the center laterally thereof.

Figure 8:
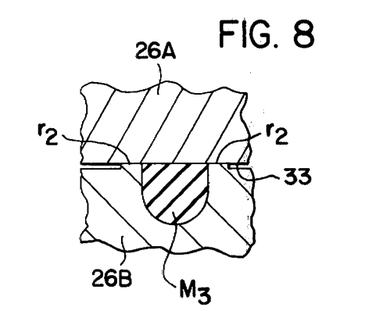
FIG. 8 is a partial sectional view on line 8—8 of FIG. 6.

The rear face of the die to which flange 24 is connected is provided on entrance portions 30A and 30B of the substantially reduced thickness, and portion 30A has a tapered bore 31 which further reduces the cross section of strand $M_1$ to a strand $M_2$ of preferably U-shaped cross section extending into the main die parts. As indicated in FIG. 5, the strand $M_2$ and branches thereof are formed entirely in the lower die part 26B to facilitate machining, and hence are U-shaped in cross section (FIG. 8), but obviously they could be formed in both die parts and have a circular cross section if desired.

Figure 1:
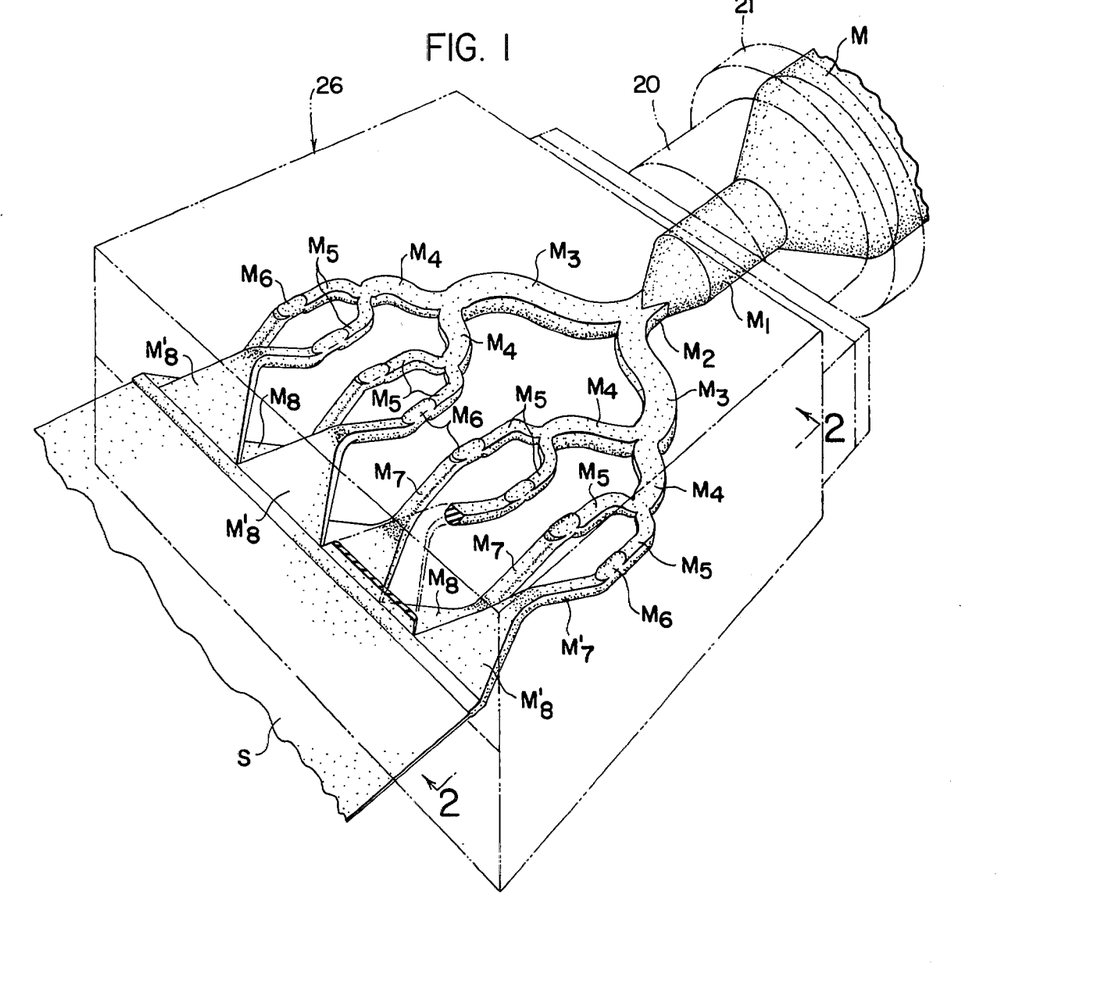
FIG. 1 is a perspective view showing the paths of the elastomeric material coming from the extruder and passing through the sheet extrusion die, the extruder discharge nozzle and the extrusion die being shown in phantom.
Figure 2:
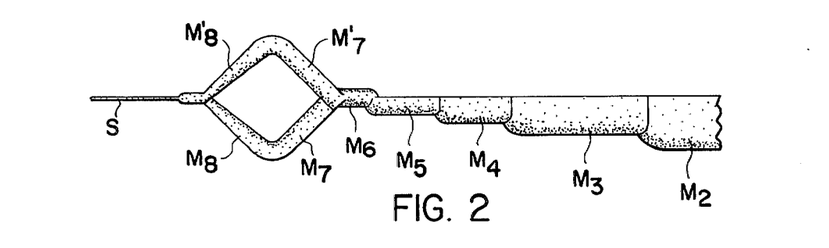
FIG. 2 is a side elevation on line 2—2 of FIG. 1 showing the elastomeric material with the die removed.
Figure 3:
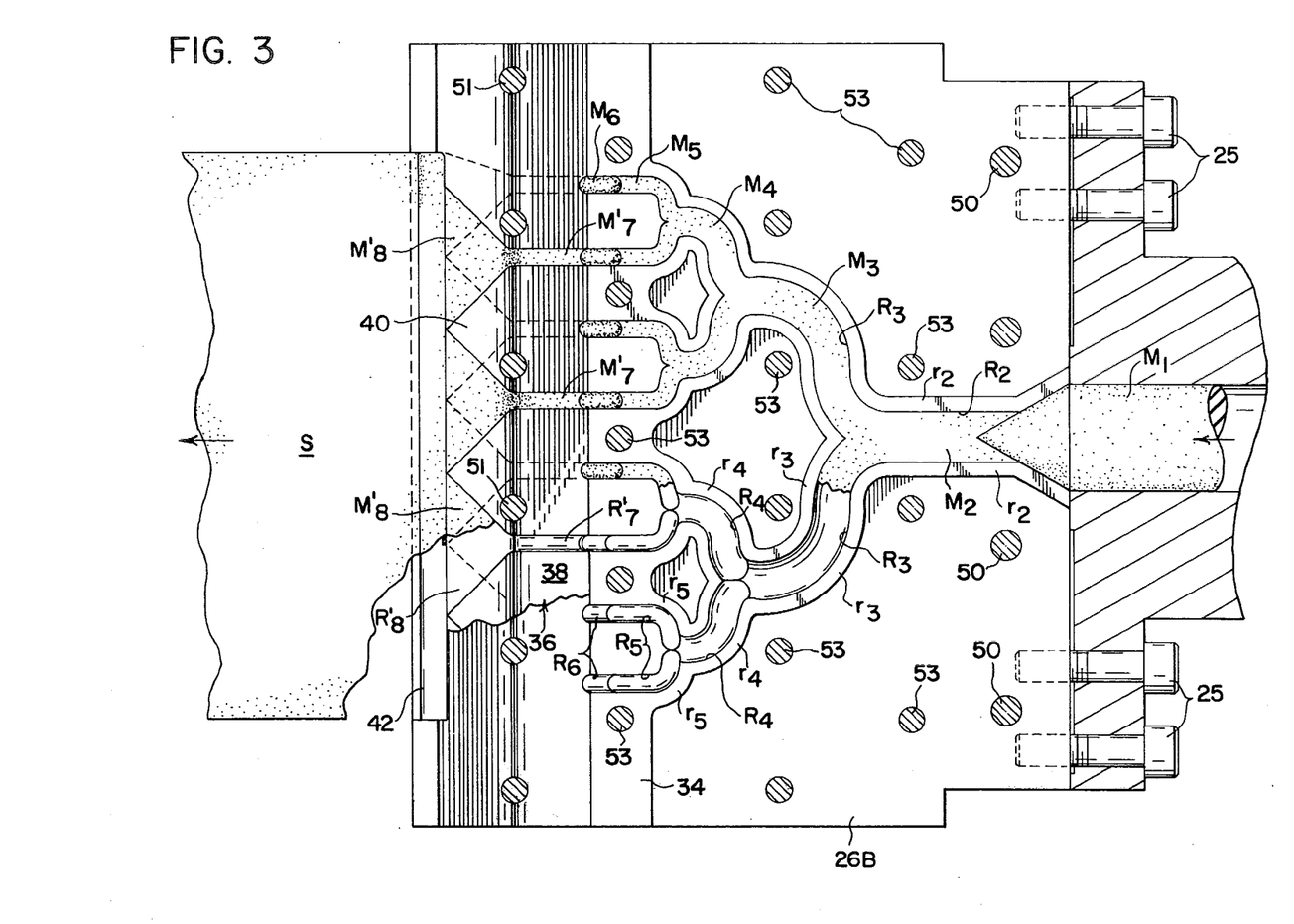
FIG. 3 is a plan sectional view taken on the parting line of the die, as on line 3—23 of FIG. 5.

Referring to FIGS. 1 and 3, the strand $M_2$ is divided and subdivided by a symmetrical runner system, first into two strands $M_3$ of equal length and cross section, then into four strands $M_4$ of equal length and cross section, and then into eight strands $M_5$ of equal length and cross section. The runner grooves $R_2$, $R_3$, $R_4$ and $R_5$ are all formed in the upper face of lower die part 26B, and preferably have marginal ribbon surfaces $r_2$, $r_3$, $r_4$ and $r_5$, respectively, extending along the sides of the grooves in the parting plane of the die for abutting the bottom face 33 of the upper die part 26A.

Figure 6:
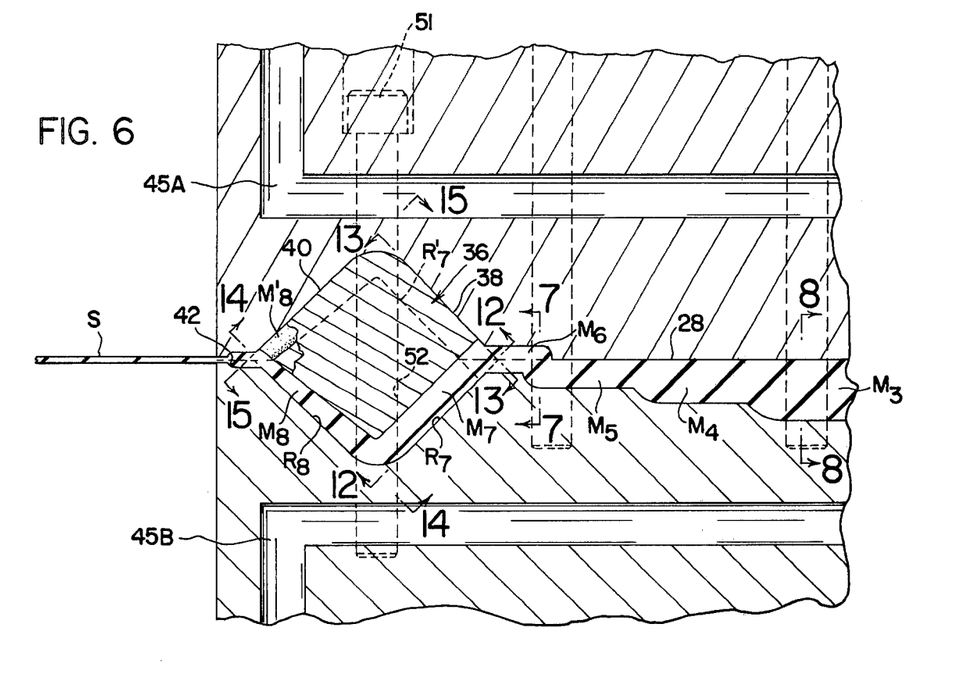
FIG. 6 is an enlarged partial sectional view on line 6—6 of FIG. 4.
Figure 7:
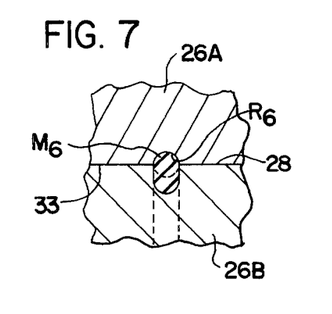
FIG. 7 is a partial sectional view on line 7—7 of FIG. 6.

As shown in FIGS. 3, 6 and 7, the runner grooves $R_5$ merge into cylindrical grooves $R_6$ which have their axes in the parting plane 28 of the die parts and are formed half in the upper die part 26A and half in the lower die part 26B. Cylindrical strands $M_6$ are formed in the grooves $R_6$, and the marginal ribbon surfaces $r_5$ merge into a transverse abutment surface 34 at the same level which extends between the runners $R_5$ and $R_6$ and beyond the outer runners $R_5$ and $R_6$ to the side edges of the die part 26B.

The grooves $R_6$ terminate at the adjacent rear corner of a transverse die bar of substantially square cross section indicated as a whole at 36, with the centerlines of the grooves in the parting plane 28. The bar is oriented so that the parting plane 28 passes through a diagonal of the bar. As shown in FIGS. 3, 6, 12 and 13, alternate grooves $R_6$ connect with U-shaped grooves $R_7$ of substantially equal cross section in the bar 36 which extend from the rear corner along the lower downwardly inclined face 37 of the bar to its bottom corner, and the other grooves $R_6$ connect with U-shaped grooves $R'_7$ of substantially equal cross section in the bar 36 and extending from its rear corner along the upper upwardly inclined face 38 of the bar to its top corner. The strands formed in grooves $R_7$ are designated $M_7$ and the strands formed in grooves $R'_7$ are designated $M'_7$. It will be seen that the strands of material from $M_1$ through the strands $M_7$ and $M'_7$ are identical in length and in progressive cross section.

At the bottom corner of bar 36, the grooves $R_7$ connect with the apexes of flattened triangular grooves or transition recesses $R_8$ which extend upwardly along the lower upwardly inclined face 39 of the bar to its front corner, and at the top corner of bar 36 the grooves $R'_7$ connect with the apexes of triangular grooves or transition recesses $R'_8$ which extend downwardly along the upper downwardly inclined face 40 of the bar to its front corner.

Figure 13:
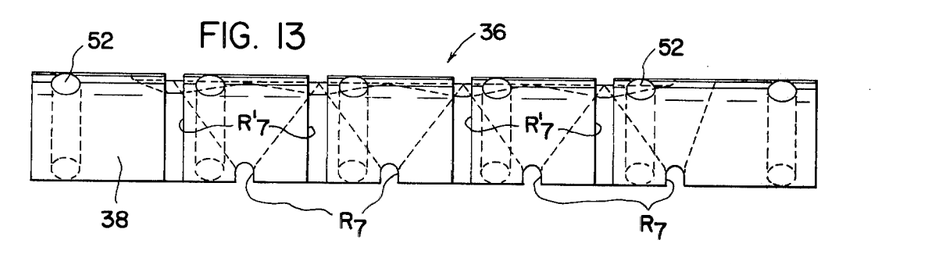
Figures 14, 15:
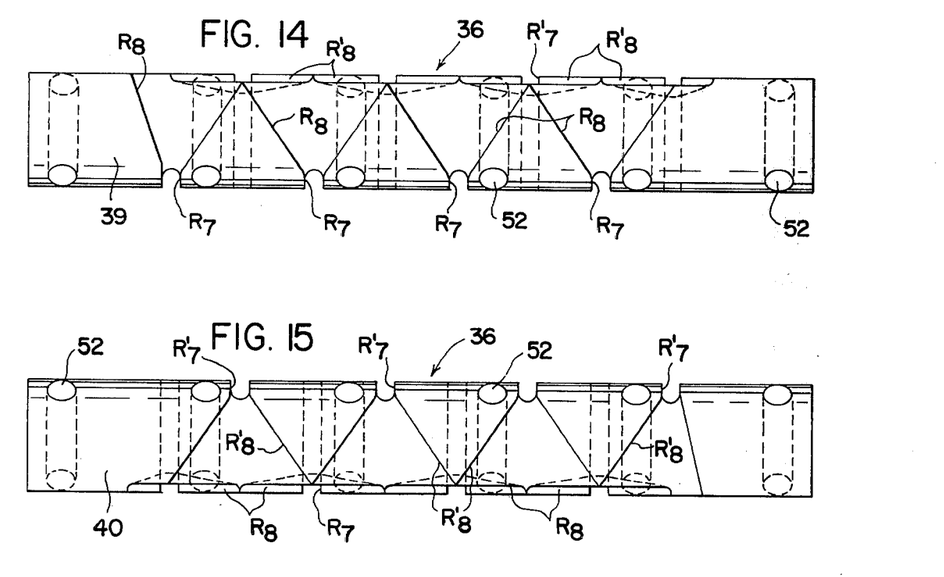

From their apexes the triangular recesses $R_8$ and $R'_8$ gradually increase in lateral dimension and decrease in vertical dimension while maintaining substantially the same cross sectional area. The front edges of the recesses $R_8$ are contiguous at the front corner of the bar 36, as are the front edges of the recesses $R'_8$ (FIGS. 13 and 14). The recesses $R_8$ and $R'_8$ overlap each other in staggered relation and merge together at the front corner of the bar 36 where they connect with a stepped extrusion slot 42 extending continuously across the die at the parting plane from which the sheet S is extruded (FIG. 5).

Accordingly, the difference in flow characteristics of the material $M_8$ along the sides and central portion of the recesses $R_8$ is compensated for by the differing flow characteristics of the material $M'_8$ in the overlapping recesses $R'_8$ due to their staggered relationship with one recess $R_8$ overlapping two halves of recesses $R'_8$. In other words, the side edges of the recesses $R_8$ terminate and merge with the terminating central portions of the recesses $R'_8$ at the extrusion slot so that differences in flow characteristics are essentially balanced and a sheet of uniform strength throughout its width is extruded. The recess $R_8$ at one end of the bar 36 and the recess $R'_8$ at the other end are slightly narrower than the other recesses, but the difference is not sufficient to materially affect the flow characteristics.

Obviously, the symmetrical runner system and the width of the sheet S can be expanded by multiplying the number of runners and increasing the width of the dies and die cross bar correspondingly, in which case the supply of extruded material would be increased accordingly.

The die parts 26A and 26B are preferably provided with U-shaped cooling passageways 45A and 45B which are spaced apart laterally and extend longitudinally through the major portions of the die parts. The horizontal portions of these passageways are located adjacent to the runner system so as to control the temperature of the material therein and minimize changes in flow characteristics due to temperature changes. The inlet and outlet pipes 46 and 47 may be connected to suitable manifolds (not shown) for the supply and exhaust of heat exchange fluid. If desired, a cooling passageay may be provided axially through the bar 36 and connected at the ends to the same supply and exhaust manifolds.

Figure 9:
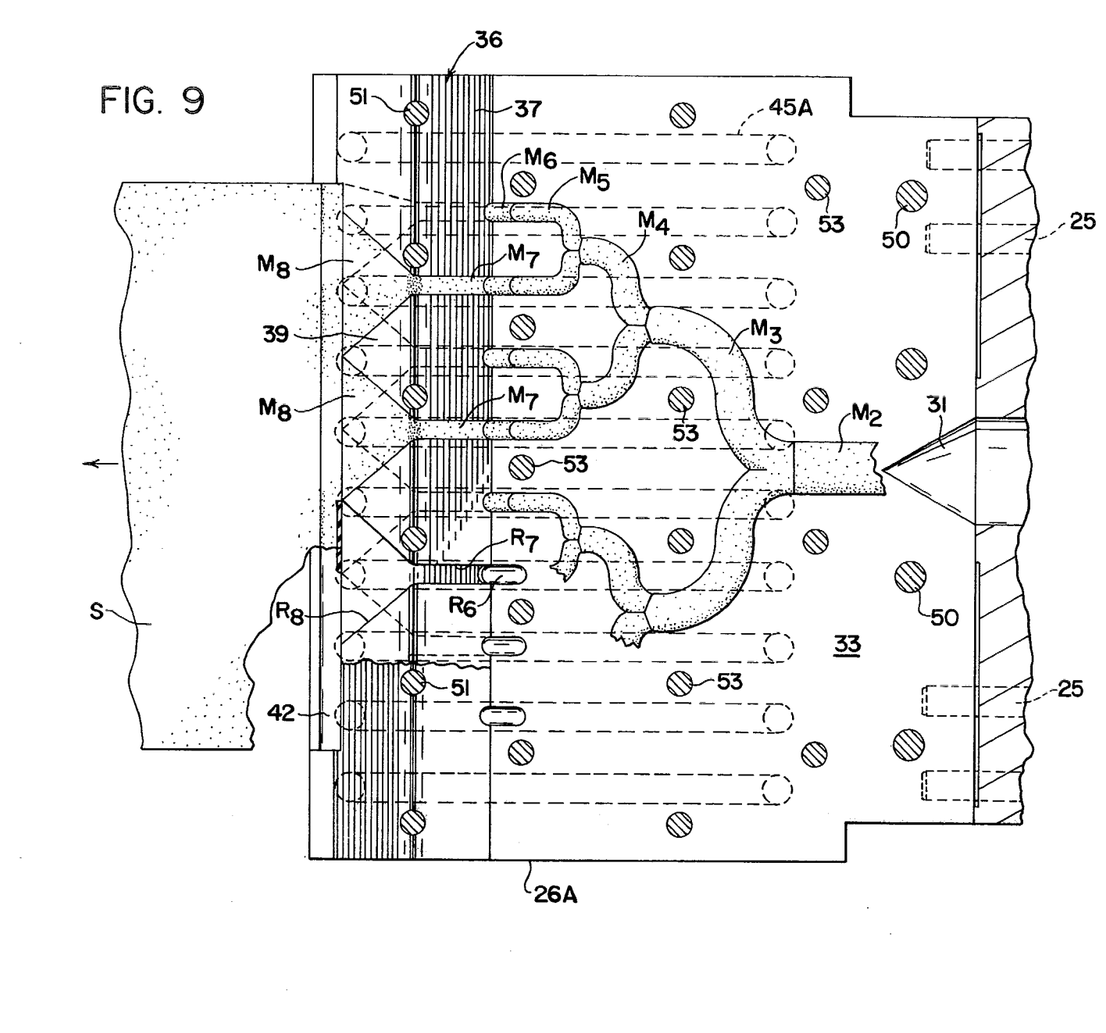
FIG. 9 is a bottom plan sectional view, partly broken away on line 9—9 of FIG. 5.
Figure 10:
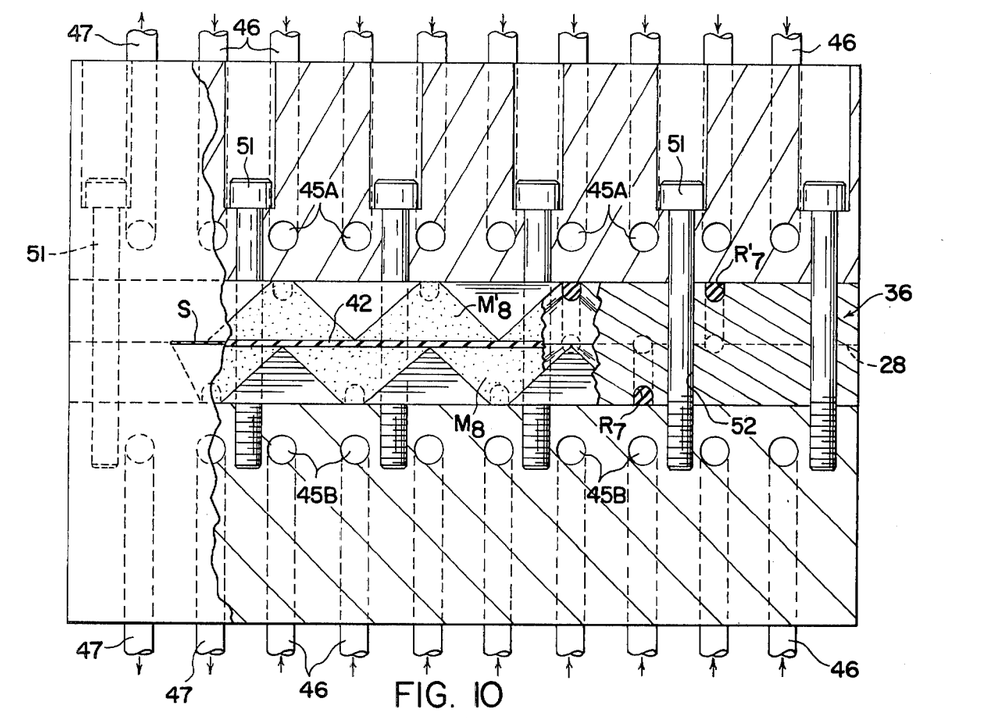
FIG. 10 is an enlarged front elevational view, partly broken away and in section, on line 10—10 of FIG. 4.
Figure 11:
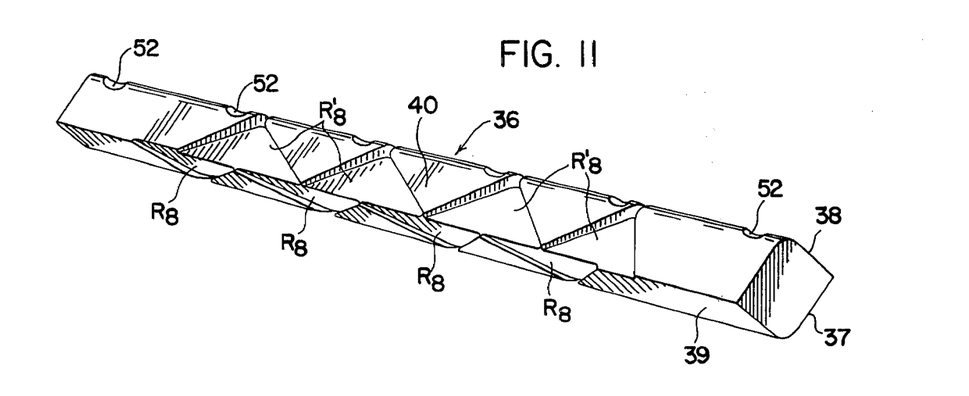
FIG. 11 is a detached perspective view of the removable cross bar within the die.
Figure 12:
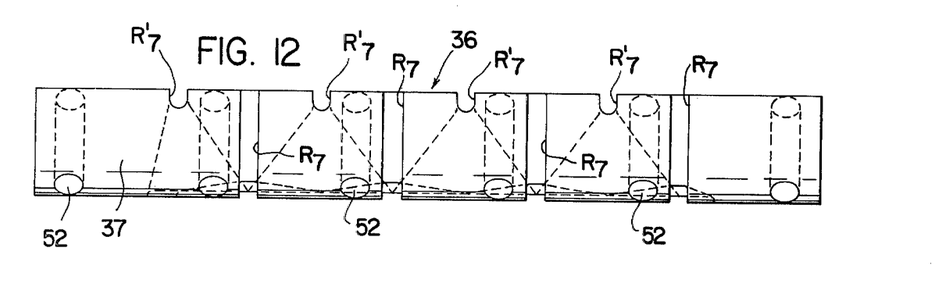
FIGS. 12–15 are elevational views of the cross bar as on lines 12—12, 13—13, 14—14 and 15—15, respectively, of FIG. 6.

The die parts 26A and 26B are held together in tight abutment at the parting plane by longitudinally spaced lateral rows of screw studs. The studs 50 clamp the reduced rear portions 30A and 30B, and the screw studs 51 clamp the front portions of the parts 26A and 26B together and also pass vertically through holes 52 on the centerline of the transverse die bar 36 to secure it in position. As is apparent from FIGS. 3 and 9, the studes 51 are positioned between the runners $R_7$ and $R'_7$, and also between the cooling passageways 45A and 45B. Other rows of screw studs 53 clamp the intermediate portions of the die parts together, and these are also located so as to be spaced from the various runners and cooling passageways.

By providing the removable die bar 36, the machining of the inclined runners $R_7$ and $R'_7$ and the triangular recesses $R_8$ and $R'_8$ is greatly simplified, and the design of the bar facilitates easy assembly and disassembly of the die.

The symmetrical multiple runner system provides a plurality of strands of equal length and gradually reduced cross section which merge into overlapping flattened triangular portions overlapping alternate flattened triangular portions in staggered relation and all merging together at the continuous sheet extrusion slot. Because the triangular portions gradually increases in width and decrease in depth while maintaining substantially the same cross sectional area, and because the edges of one set of triangular portions overlap and merge with the medial portions of the other set, the flow characteristics of the material and maintained substantially uniform at the extrusion slot with corresponding uniformity throughout the extruded sheet.

I claim:

1. A die for extruding a sheet of elastomeric material having an entrance passageway for receiving a strand of extruded material, a symmetrical runner system in said die connected to said passgeway and comprising a plurality of laterally adjacent divided and sub-divided passageways substantially equal in length and cross section, two overlapping sets of laterally adjoining flattened passageways connected to alternate laterally adjacent passageways, said sets overlapping each other in staggered relation, said flattened passageways each gradually increasing progressively in lateral dimension and decreasing in vertical dimension while maintaining substantially the same cross-sectional area, and a laterally extending continuous extrusion slot merging the exit ends of all of said flattened passageways together.

2. A die as described in claim 1, wherein the laterally adjoining flattened passageways are substantially triangular in a lateral direction.

3. A die as described in claim 2, wherein the two sets of laterally adjoining flattened passageways overlap each other in symmetrical staggered relation.

4. A die as described in claim 2, in which the two overlapping sets of laterally adjoining flattened passageways are formed in a laterally extending bar bodily removable from the mold.

5. A die as described in claim 4, wherein the removable bar is substantially rectangular in cross section, a diagonal thereof being aligned with said sub-divided passageways and said extrusion slot.

6. A die as described in claim 1, wherein the two sets of laterally adjoining flattened passageways overlap each other in symmetrical staggered relation.

7. A die as described in claim 1, in which the two overlapping sets of laterally adjoining flattened passageways are formed in a laterally extending bar bodily removable from the die.

8. A die as described in claim 7, wherein the removable bar is substantially rectangular in cross section, a diagonal thereof being aligned with said sub-divided passageways and said extrusion slot.

* * * * *